Feb. 15, 1966     K. FISCHER     3,235,709

THERMOSTATICALLY CONTROLLED ELECTRIC COOKING PLATE

Filed July 31, 1963

INVENTOR.
KARL FISCHER
BY
Hanson, Dickey & Pierce
ATTORNEYS.

United States Patent Office 3,235,709
Patented Feb. 15, 1966

3,235,709
THERMOSTATICALLY CONTROLLED ELECTRIC
COOKING PLATE
Karl Fischer, Oberderdingen, Gansberg,
Wurttemberg, Germany
Filed July 31, 1963, Ser. No. 298,873
Claims priority, application Germany, Aug. 9, 1962,
F 37,559
10 Claims. (Cl. 219—450)

The invention concerns a hotplate of the solid type having heating elements arranged underneath the hotplate body in such a manner that the hotplate can be switched selectively to a high output (for example 2000 watts) for bringing the contents of a cooking utensil placed on the hot plate to the boil and to a low output (for example 300 to 400 watts) to maintain boiling under the influence of thermostatic control, means including a temperature probe arranged at the centre of the hotplate body and adapted to make thermal contact with the bottom of the vessel.

An important feature of a temperature-controlled hotplate of this type is the manner in which the temperature probe is thermally connected on the one hand to the heating element and on the other hand to the vessel being heated.

If the thermal connection between the temperature probe and the heating element predominates over its connection with the vessel, there is no genuine temperature control but on the whole only a power output control. The temperature control means will then switch the hotplate to low output long before the contents of the vessel have reached the required temperature. The temperature curve will therefore rise very slowly, and the intervals between switching will be very brief once the state of equilibrium is reached.

If, on the other hand, the temperature probe is thermally connected mainly to the vessel being heated, then the plate will be switched to high output for a very long time. The temperature curve will therefore rise steeply and the required temperature limits will be exceeded by large amounts, the intervals between the switching operations being large. Owing to the relatively small output required to maintain the temperature once the desired temperature is reached and owing to the large masses of the hot plate and the vessel, the temperature gradient at the temperature probe will be relatively flat. Even when cooking is proceeding satisfactorily, this can often give the impression that the food is not cooking.

According to the invention, a hotplate of the solid type comprises a hotplate body, a temperature probe situated at the centre of the hotplate body and adapted for making thermal contact with the bottom of a cooking vessel placed on the hotplate, a high output heating element and a low output heating element arranged on the undersurface of said hotplate body in such a manner over the annular zone of the hotplate body surrounding the temperature probe that at least that heating element convolution closest to the temperature probe belongs to the low output heating element and thermostatic control means including said temperature probe for switching the heating from a high output in which the high output element determines, at least to a large extent, the heat output for "heating up" to a "low output" for which the low output element is switched on and off on its own to maintain boiling or in series with the high output element for simmering.

By means of this arrangement, the temperature probe is thermally connected relatively loosely to the high output element. The consequence of this is that the high power required for raising the temperature of the cooking vessel is not switched off too soon. On the other hand, the temperature probe is closely thermally connected to the low output element. The control process therefore partly has the character of an output control during the long period in which the hotplate is switched to low output simply to keep the contents of the vessel on the boil. The necessary energy is thus supplied to the food in short time intervals. With the arrangement of the heating elements according to the invention, the uniform distribution of heat over the heated annular zone of the hotplate is not impaired either when the plate is switched to high or when it is switched to low.

The power required when the hotplate is switched to high, for example 2000 watts, can be obtained in one embodiment with the two heating elements, which differ greatly in their output, by connecting them in parallel, the control means then switching off the more powerful element, for example of 1700 watts, either leaving the low output element switched on to maitain boiling or switching if off and on according to the temperature of the vessel.

Another embodiment is such that during the heating up time, the high output element (for element 2000 watts) is switched on alone, in other words the low output element (300 to 400 watts) is switched off during that time and is then switched on only when the high output element is switched off. In this embodiment, the thermal connection between the temperature probe and the heating element during the heating up time is very loose because the low output heating element, which is closer to the temperature probe, is then not switched on at all and therefore the probe is separated from the inner convolution of the high output element by a completely unheated annular zone. Since the low output element is out of action during the heating up time and therefore does not influence the thermal connection between the heating element and the temperature probe, it can be arranged as closely as desired to the temperature probe so that it is thermally coupled back to a very great extent. One thereby obtains a very good compromise between temperature control and output control.

The invention will be further described by way of example with reference to the accompanying drawings, wherein, in radial sections through the hotplates the high output element is shown of large diameter and the low output element of small diameter, wherein the cross-section of the heating element that is switched on is blacked in and wherein.

Figure 1:
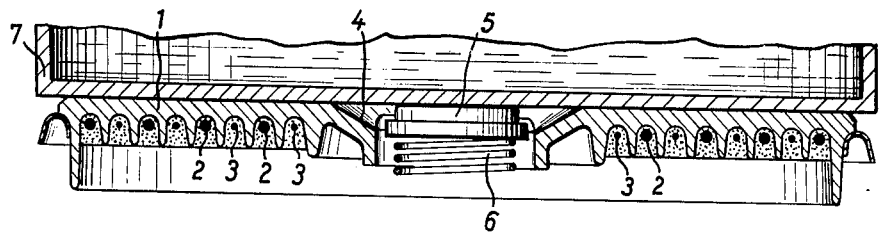
FIG. 1 is a radial section through a hotplate with two heating elements which are arranged to be connected in parallel, switched on for heating up.
Figure 2:
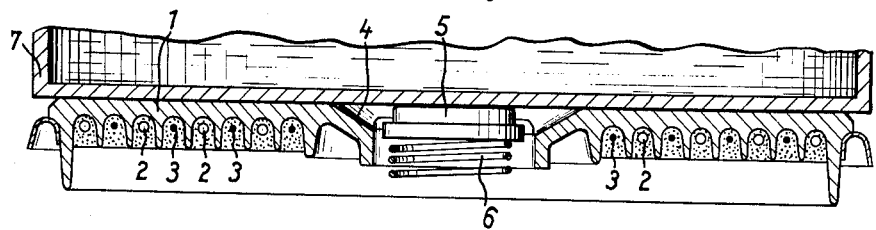
FIG. 2 is a corresponding section with the hotplate switched to low to maintain boiling.

Referring to FIGS. 1 and 2, there is shown therein a solid hotplate of the usual kind. The body 1 of the hotplate has spiral grooves on its undersurface containing two heating elements 2 and 3 embedded in insulating material. The element 2 is a high power element and is shown to have a larger cross-section than the other element 3 which is a comparatively low power element. The elements are arranged in an annular zone around the central portion of the hotplate, which has a depression 4 in its upper surface and surrounding a central aperture. A disc-shaped temperature probe 5 of the temperature control device is arranged in said central aperture in the body 1 of the plate. The temperature probe 5 is pressed against the bottom of the cooking utensil 7 by means of a spring 6, and in its position of rest it projects slightly above the upper flat surface of the hotplate.

In the embodiment shown in FIGS. 1 and 2, the two elements 2 and 3 are connected in parallel for "heating up." The high output element 2 may have an output, for example, of 1700 watt, and the low output element 3 may have an output of 300 watt, so that an output of 2000 watt is obtained for "heating up."

Figure 3:
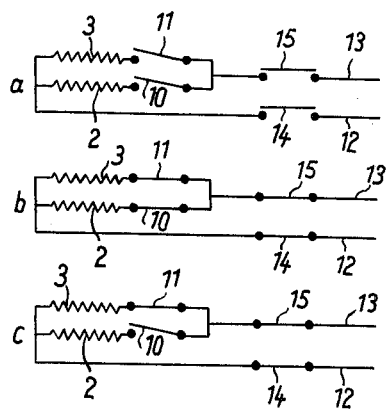
FIG. 3 shows at a, b and c the circuit diagram of the heating elements of the hotplate of FIGS. 1 and 2 in three conditions.

The electrical circuit for the heating elements 2 and 3 is shown in FIG. 3 wherein it is seen that the elements are connected in series with individual thermostat switch contacts 10 and 11 respectively. The elements 2 and 3 together with their thermostat switch contacts 10 and 11 are connected in parallel between mains leads 12 and 13 containing a mains switch having contacts 14 and 15. The mains switch contacts are shown open in FIG. 3a, and closed in FIGS. 3b and 3c. FIG. 3a shows both the thermostat contacts 10 and 11 open, as may happen under the highest temperature conditions during simmering. FIG. 3b shows both the thermostat contacts 10 and 11 closed, as is the case during warming up. FIG. 3c shows the thermostat contact 10 in series with the high output element 2 open and the thermostat contact 11 in series with the low output element 3 closed, as happens during simmering.

The temperature probe 5 is hollow and contains a thermally expansible liquid. The probe 5 is connected by a capillary tube (not shown) to a bellows (also not shown). The bellows actuate a forked lever which individually adjustably actuates the thermostat switch contacts 10 and 11 which are of the snap-action type. The adjustment is such that the contact 10 is opened at a lower temperature than is the contact 11.

In FIG. 1 both the elements 2 and 3 are shown blacked-in, corresponding to both elements being switched on, according to FIG. 3b. In FIG. 2 only the low output element 3 is shown blacked-in corresponding to the element 3 only being switched on, according to FIG. 3c.

The elements 2 and 3 are arranged in the two spiral grooves which are intercoiled with one another on the undersurface of the body 1 of the hotplate so that the convolution closest to the temperature probe 5 is the innermost convolution of the low output element 3. The thermal connection between the high output element 2 and the temperature probe 5 is therefore attenuated because the path of thermal conduction from this element to the temperature probe is long both in the body 1 of the hotplate and in the bottom of the cooking utensil 7. The low output element 3, which is closer to the temperature probe 5, only slightly increases the effective overall thermal connection between the heating elements and the temperature probe during the heating up period. Owing to the relatively weak overall thermal connection between the elements and the temperature probe during the heating up period, the output used for "heating up" remains effective until the required temperature of the contents of the vessel 7 is practically reached.

Once this temperature is reached the expansible liquid in the probe 5 operates the bellows to open the thermostat switch contact 10 to switch off the high output element 2 while the low output element 3 remains switched on (FIGS. 2 and 3c). If the temperature rises further the thermostat switch contact 11 is also opened (FIG. 3a) so that both heating elements remain switched off until the temperature falls sufficiently for the contact 11 to close again and so switch on the low output element 3. Since the innermost convolution of the low output element 3, which is now the only one switched on, is relatively close to the temperature probe 5, the overall thermal connection between the heating element and the temperature probe 5 is greater. The proportion of heat entering the vessel directly from the heated annular zone of the hotplate to that entering the vessel through the temperature probe is now considerably smaller than during the heating up period. The proportion of heat transmitted from the temperature probe is thus greater than during the heating up period. This results in a much greater degree of control of the elements in accordance with the hotplate temperature as opposed to control according to the vessel temperature. The contact 11 therefore switches on and off at short time intervals to maintain the temperature. The ratio of the time during which the low output element 3 is switched on to the time during which it is switched off and hence the magnitude of the effective power used to maintain cooking will depend on the thermal resistance of the contents of the vessel. If this resistance is low (e.g. in the case of liquid food), then more heat will flow directly through the surface of contact of the hotplate into the contents of the vessel, and the amount of heat conducted to the temperature probe will be small. In this case, the heating element 3 will only be switched off for brief periods at long intervals. In some cases, if the output required to maintain boiling is not quite sufficient, the high output element 2 may even be switched on again for short periods. In the case of foods having a high thermal resistance (e.g. rice and stews) on the other hand, the periods during which the low output element 3 is switched on are brief and the periods during which it is switched off are long.

Figure 4:
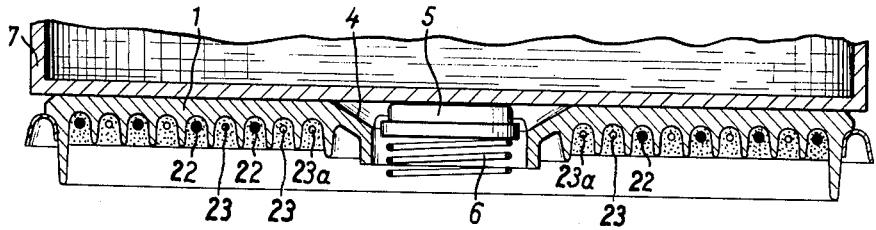
FIG. 4 is a radial section through another embodiment of hotplate in which the two heating elements are arranged to be switched on separately, the plate being shown as switched to "heating up"
Figure 5:
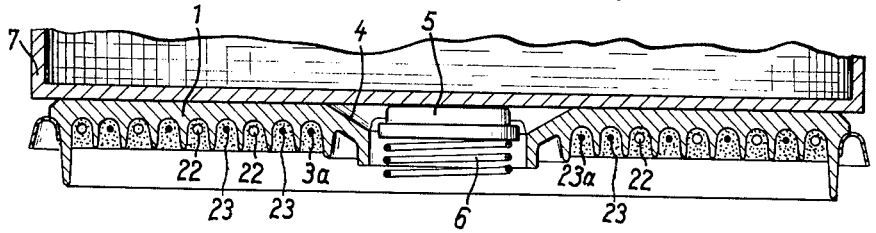
FIG. 5 is a corresponding section with the hotplate switched to "maintain boiling.

In the embodiment of hotplate shown in FIGS. 4 and 5, parts like those of the embodiment of FIGS. 1 and 2 are denoted by like reference numerals and will not be described again.

In the embodiment of FIGS. 4 and 5, however, the low output element of 300 watt and denoted by the reference 23 is switched off during the "heating up" phase. The high output element, denoted by the reference 22, therefore, has, in this embodiment, a somewhat greater output, for example, about 2000 watt, than that of the element 2 of FIGS. 1 and 2. In addition the low output element 23 has two convolutions nearer the temperature probe 5 than the innermost convolution of the high output element 22. Furthermore the innermost convolution of the low output element 23, denoted by the reference 23a, is closer to the temperature probe 5 than any convolution of the corresponding element 3 of FIGS. 1 and 2.

Figure 6:
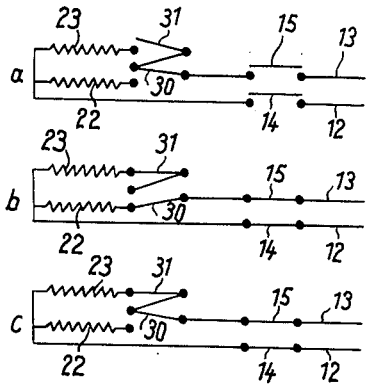
" and FIG. 6 shows at a, b and c the circuit diagram of the heating elements of the hotplate of FIGS. 4 and 5 in three conditions.

The electrical circuit for the heating elements 22 and 23 is shown in FIG. 6. Thermostat switch contacts 30 and 31 are actuated by thermally expansible liquid in the temperature probe 5 in the same manner as are the contacts 10 and 11 of FIG. 3. The contact 30 is shown in FIG. 6b in one position in which it places the high output element 22 in circuit, as during "heating up." In its other position, as shown in FIGS. 6a and 6c, the contact 30 places the contact 31 in circuit. The contact 31 is in series with the low output element 23 and only opens (FIG. 6a) at a probe temperature higher than that at which the contact 30 switches to the position shown in FIGS. 6a and 6c. The hot plate of FIGS. 4 and 5 therefore operates in the same way as that of FIGS. 1 and 2 except that the low output element 23 is not used during heating up (FIG. 6b). This is also illustrated in FIG. 4 wherein only high output element 22 is shown blacked-in to indicate that it is on. In FIG. 5 only the low output element 23 is shown blacked-in, indicating that it is on as happens during simmering and in accordance with FIG. 6c.

The additional convolution 23a of the low output element 23 is particularly close to the temperature probe 5 and extends into the central part of the hot plate, which in the normal way is unheated. It will be seen that the flow of heat from the convolution 23a is mainly in the part of the hotplate which is separated from the bottom of the cooking vessel 7 by the depression 4. This increases the flow of heat through the temperature probe 5. The thermal connection of the low output element 23 with the temperature probe 5 is thus much closer and therefore the heating control is more nearly a control in accordance with the hotplate temperature during the low output heating of the hotplate as compared with the embodiment shown in FIGURES 1 and 2. In spite of this, the effective thermal connection of the temperature probe 5 with the heating elements is looser during the heating up time, because the low output element is switched off and does not take part in the overall thermal connection.

In another embodiment of hotplate (not illustrated) the low output heating element is connected in series with the high output element for simmering instead of being switched on on its own.

I claim:
1. A hotplate of the solid type comprising a hotplate body; temperature sensing means situated generally centrally of said hotplate and adapted for making thermal contact with the base of a cooking vessel placed on the hotplate body; a high output heating element; a low output heating element, said heating elements being arranged at the undersurface of said hotplate body and having convolutions encircling said temperature sensing means, said low output heating element having at least one convolution which is closer to said temperature sensing means than any convolution of said high output heating element; thermostatic control means, said control means including said temperature sensing means, first electrical switch means associated with said heating elements for switching off a high heat output obtained at least largely from said high output element when a predetermined temperature is sensed by said sensing means, and second switch means for switching on and off said low output heating element to maintain an intermittent low heat output.

2. A hotplate according to claim 1 wherein both said first and said second switch means are adapted to connect said high and low output heating elements in parallel to maintain said high heat output until said predetermined temperature is reached and to switch said low output heating element alone on and off to maintain said intermittent low heat output.

3. A hotplate according to claim 1, wherein said first switch means is adapted to switch on said high output heating element alone to maintain said high heat output until said predetermined temperature is reached and wherein said second switch means is adapted to switch said low output heating element on and off alone to maintain said intermittent low heat output.

4. A hotplate of the solid type comprising a thermally conductive hotplate body; a temperature probe situated centrally of said hotplate body; means biasing said temperature probe for thermal contact with the base of a cooking vessel placed on said hotplate; a high output heating element; a low output heating element, said heating elements being arranged at the undersurface of said hotplate body and having convolutions encircling said temperature probe, at least the innermost convolution of said low output heating element lying closer to said temperature probe than the innermost convolution of said high output heating element; and thermostatic control means including said temperature probe, first electrical switch means associated with said heating elements for switching on at least said high output heating element, when the temperature sensed by said temperature probe is below a lower predetermined temperature, to maintain a high rate of heat output, and second means for switching said low output heating element on and off according as to whether the temperature sensed by said temperature probe is below or above a higher predetermined temperature to maintain an intermittent low heat output.

5. A hotplate according to claim 4 wherein said temperature probe contains a thermally expansible liquid and wherein said thermostatic control means also includes liquid actuated means and tube means connecting said temperature probe with said liquid actuated means, said liquid actuated means being mechanically coupled to both said electrical switch means for actuation thereof.

6. A hotplate of the solid type comprising a thermally conductive hotplate body; temperature sensing means situated centrally of said hotplate body and adapted for making thermal contact with the base of a cooking vessel placed on an upper surface of said hotplate body an undersurface of said hotplate body having first and second interconvoluted spiral groove means therein encircling said temperature sensing means, said first spiral groove means having an innermost convolution closer to said temperature sensing means than at least the innermost convolution of said second spiral groove means; a low output heating element arranged in said first spiral groove means; a comparatively high output heating element arranged in said second spiral groove means; and thermostatic control means, said control means, including said temperature sensing means, first electrical switch means associated with said heating elements for switching off a high heat output obtained at least largely from said high output element when a predetermined temperature is sensed by said sensing means, and second means for switching on and off said low output heating element to maintain an intermittent low heat output.

7. A hotplate according to claim 6 wherein said both switch means are adapted to connect said high and low output heating elements in parallel to maintain said high heat output until said predetermined temperature is reached and to switch said low output heating element alone on and off to maintain said intermittent low heat output.

8. A hotplate according to claim 7 wherein said high output heating element is rated at about 1700 watt and said low output heating element is rated at about 300 watt.

9. A hotplate according to claim 6 wherein said first and said second switch means are adapted to switch on said high output heating element alone to maintain said high heat output until said predetermined temperature is reached and to switch said low output heating element on and off alone to maintain said intermittent low heat output.

10. A hotplate according to claim 9 wherein said high output heating element is rated at about 2000 watt and said low output heating element is rated at between about 300 and about 400 watt.

References Cited by the Examiner

UNITED STATES PATENTS

| 1,637,155 | 7/1927 | Marsden | 219—452 |
| 2,288,510 | 6/1942 | Brannon | 219—450 |
| 2,417,223 | 3/1947 | Visitacion | 219—446 |
| 2,430,715 | 11/1947 | Grayson | 219—450 |
| 2,715,176 | 8/1955 | Schoberle | 219—450 |
| 2,740,879 | 4/1956 | Bieling et al. | 219—449 |
| 2,823,290 | 2/1958 | Warner | 219—450 |
| 3,114,027 | 12/1963 | Busch et al. | 219—450 |

ANTHONY BARTIS *Acting Primary Examiner.*

RICHARD M. WOOD, *Examiner.*

L. H. BENDER, *Assistant Examiner.*